(No Model.)

J. A. O'DELL.
NON-PUNCTURABLE BICYCLE TIRE.

No. 587,227. Patented July 27, 1897.

Witnesses
Edmund A. Straus
Lucy M. Graves

Inventor.
Jacob A. O'Dell,
by John Wedderburn
Attorney

UNITED STATES PATENT OFFICE.

JACOB A. O'DELL, OF PHILADELPHIA, PENNSYLVANIA.

NON-PUNCTURABLE BICYCLE-TIRE.

SPECIFICATION forming part of Letters Patent No. 587,227, dated July 27, 1897.

Application filed July 8, 1896. Serial No. 598,464. (No model.)

*To all whom it may concern:*

Be it known that I, JACOB A. O'DELL, a citizen of the United States, residing at Philadelphia, in the county of Philadelphia and State of Pennsylvania, have invented certain new and useful Improvements in Bicycle-Tires; and I do hereby declare the following to be a full, clear, and exact description of the invention, such as will enable others skilled in the art to which it appertains to make and use the same.

My invention relates to vehicle-wheel tires, and more particularly to an improved tire especially adapted for use in connection with bicycles.

My object is to provide a wheel-tire which will possess all the advantages of the pneumatic tire, but none of its disadvantages, such as easy puncturing, wearing out, and leakage of air.

A further object is to provide a wheel-tire of novel construction which can be applied to the ordinary rim or felly, and one which will possess great resiliency, but will be extremely strong and adapted to withstand extremely hard usage.

Having these objects in view, my invention consists of a bicycle-wheel tire comprising a series of springs of substantially circular shape in connection with an outer covering or protector and novel means for holding both the springs and the protector in position.

The invention further consists of certain novel features and combinations appearing more fully hereinafter.

Figure 1:
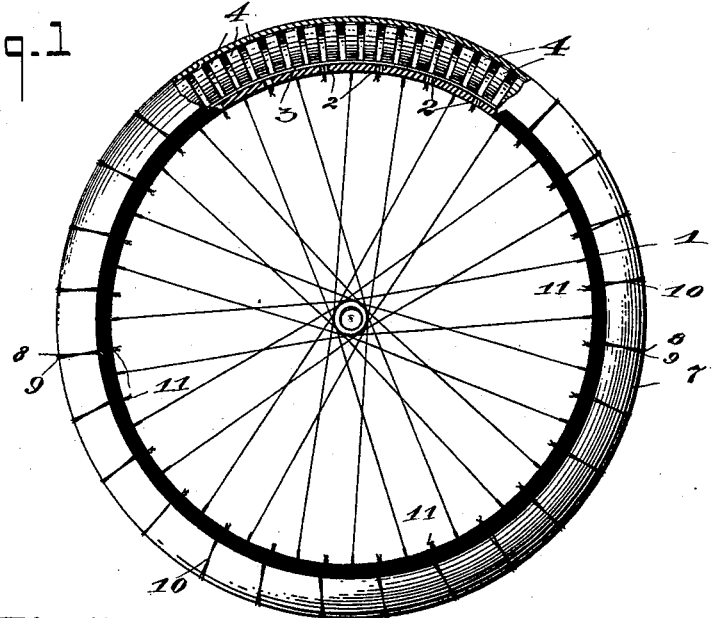
Figure 2:
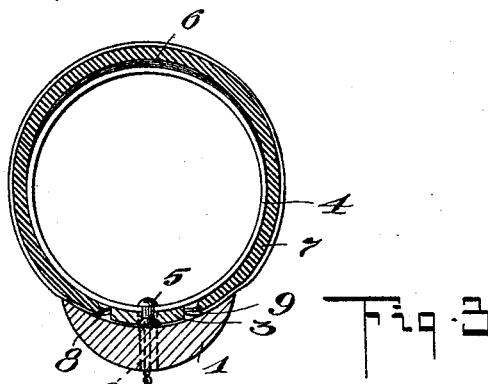

In the accompanying drawings, Figure 1 is a parallel sectional side elevation of my improved tire. Fig. 2 is a cross-sectional view, and Fig. 3 a view of a section of tire shown partially broken away and disclosing one of the connectors or adjusters for the wires.

The numeral 1 designates an ordinary wheel-rim, and in the present instance this rim is provided with a series of holes 2, which are centrally disposed and extend entirely around the rim, being located between the spokes. The lacing-cords pass through these holes, as will appear more fully hereinafter.

At 3 is shown an annular metal band which extends completely around the rim, being located in the groove thereof and tightly fitting said rim.

The numeral 4 designates a series of circular ribbon-springs which are located closely together and are connected by any preferred fastening—in the present instance rivets 5—to the annular band 3. These springs are of sufficient strength to properly support the bicycle, but at the same time they possess great resiliency, so that all jarring or jolting occasioned by passing over rough roads and obstacles will be more satisfactorily cushioned. The upper portions of the springs are somewhat rounded or convexed, as at 6, so that the protector or covering to be described later on will not be injured.

The numeral 7 designates an ordinary pneumatic tire, which is preferably of extra thickness, so that it will not become injured by contact with the springs, and this covering or protector is slotted on its under side and is of such size that its ends will be snugly received in between the rim and the springs. The lacing-strings 8 and 9 are connected to the contiguous and lower edges of the covering at its junction with each spring, and these lacing-strings are crossed and brought twice around the tire or covering and the springs, as at 10, and then pass through one of the openings 2, which is in alinement with the spring, and are tied together, as shown at 11. When thus arranged, the lower edges of the covering are drawn tightly together underneath the springs and between them and the tire, and a tire which is far superior to the ordinary pneumatic tire is provided, inasmuch as no matter how many cuts or punctures are received its efficiency is not materially impaired, as it is kept in proper shape by the springs and is only used to prevent them from becoming worn and to give an even tread. The covering, after being placed in position, is suitably cemented to the rim, so that it will be better held in position.

Figure 3:
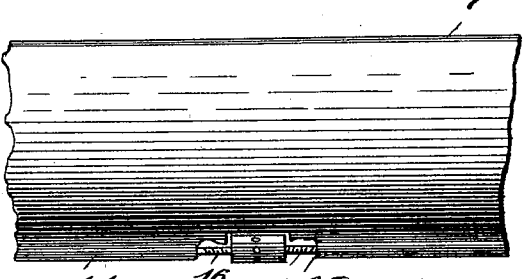

In Fig. 3 I have shown circumferential wires, which extend loosely through the contiguous edges of the covering, that are formed into loops. The ends of the wires are provided with opposite screw-threads, as at 16 and 17, and an adjusting-sleeve 18, into which the ends of the wires project, is adapted to be turned so that the ends will be brought together and the covering or protector drawn down in between the springs and the rim.

It is obvious that many slight and immaterial changes of construction might be resorted to without detracting from the advantages of my invention, and it is to be understood, therefore, that I do not limit myself to the precise construction herein shown and described, but consider that I am entitled to all such variations as come within the spirit and scope of the invention.

Having thus described my invention, what I claim as new, and desire to secure by Letters Patent, is—

The combination with a crescent-shaped rim, of a spacing-band extending entirely around the same, a plurality of springs connected to said band and held apart from the rim thereby, an outer case or cover extending around said springs and having its longitudinal edges inserted between the rim and springs, and lacings attached to the edges of the cover and insertible through centrally-arranged openings in the rim where they may be tied, the said lacings operating to draw the edges of the outer casing inward between the rim and springs and toward or against the spacing-band, substantially as described.

In testimony whereof I have signed this specification in the presence of two subscribing witnesses.

JACOB A. O'DELL.

Witnesses:
M. S. SMITH,
HENRY KAIN.